Sept 10, 1957 K. A. KNUTSEN 2,805,824
ARRANGEMENTS FOR CHECKING THE TRANSCRIPTION OF NUMBERS AND
ARITHMETICAL OPERATIONS EFFECTED IN ACCOUNTING MACHINES
Filed July 16, 1951 6 Sheets-Sheet 1

Sept 10, 1957 K. A. KNUTSEN 2,805,824
ARRANGEMENTS FOR CHECKING THE TRANSCRIPTION OF NUMBERS AND
ARITHMETICAL OPERATIONS EFFECTED IN ACCOUNTING MACHINES
Filed July 16, 1951 6 Sheets-Sheet 6

United States Patent Office 2,805,824
Patented Sept. 10, 1957

2,805,824

ARRANGEMENTS FOR CHECKING THE TRANSCRIPTION OF NUMBERS AND ARITHMETICAL OPERATIONS EFFECTED IN ACCOUNTING MACHINES

Knut Andreas Knutsen, Paris, France, assignor to Compagnie des Machines Bull (Societe Anonyme), Paris, France Application July 16, 1951, Serial No. 237,042

Claims priority, application France July 20, 1950

7 Claims. (Cl. 235—61.7)

The present invention relates to arrangements for accurately controlling the accuracy of numbers and the arithmetical operations dealt with by accounting machines, and more particularly, but not exclusively, by machines known as calculating and tabulating machines. In the purpose to control the accuracy of numbers, the data cards may be provided with additional characteristic marks corresponding to a figure or check symbol. The check symbol calculated by the accounting machine may be compared with the one recorded on said cards. The check known as "by 9" of multiplications is universally known; it is known that it is applied to four fundamental arithmetical operations and that it is possible, although the application is less simple and the safety factor obtained against errors may be smaller, to carry out a similar check with a basic whole number "$n$" different from 9, which check may be called "by $n$." In order to carry out this last check, there is calculated on each term of the operation to be made, the value of a "check symbol" which is the remainder from the division of this term by "$n$" and an operation parallel to the main operation is carried out on the symbols; the result of the auxiliary operation on the check symbols with the casting-out of the greatest multiple of "$n$" included should agree with the check symbol of the result of the main operation It is possible to provide electromechanical arrangements which automatically control the result of the main operation by an auxiliary operation on the symbols.

The check by 11 enables the operation to be carrried out relatively simply. If a different figure "$n$" is adopted, the arrangements are more complicated without necessarily providing increased security against errors. It is obvious that if $n$ is taken to equal 3 for example, an error of 3 (or for example a 7 instead of a 4) on one figure could not be picked up. In accordance with the present invention, it is possible to obtain very satisfactory safeguard against errors by means of combinations of several distinct arrangements each applying the check by "$n$" to the operations carried out by the accounting machines, distinct and suitably selected values $n1, n2 \ldots np$ of "$n$" being attributed to each of the "$p$" arrangements.

The invention particularly relates to the combination of a first distinct calculating member automatically carrying out the check by $n1$ of the arithmetical operation to be controlled undertaken by the accounting machine, a second distinct calculating member effecting the same check by $n2$ and a utilization means (emitting a warning signal, impressing a characteristic sign, blocking the machine, etc.) serving to indicate the error exposed by at least one of the two arrangements.

For practical reasons involved in the construction of the arrangements, the invention relates particularly to a combination of two separate calculating members of the foregoing type in which $n1$ and $n2$ are of the form $2^k-1$, or for example more particularly according to the preferred embodiment of the invention in which $n1=3$ and $n2=7$.

Each of the said separate calculating members will necessarily comprise: a first cyclic totalizing member on the basis of $n$ (that is to say of a capacity $n$ and without carry-over) into which enters one of the starting terms of the operation (for example, multiplier in the case of multiplication); a second similar totalizing member for the other starting term (for example multiplicand); a third similar totalizing member for the "result" term ((for example, product); a member effecting on the figures entered in the first two totalizing members an operation parallel with the main operation, while extracting the largest possible multiple of $n$; a member comparing (for example, by subtraction) the result supplied by this member to the figure indicated by the third totalizing member and actuating the utilization means.

Certain of these elements may be wholly or partly combined. The terms of the operation to be controlled may be taken on the accounting machine, either on recording totalizers, or read directly on the perforated card.

The cyclic totalizer members calculating the "symbols" may be of various types without departing from the scope of the invention. In particular they may be of the mechanical wheel type, or of the electro-magnetic type usual in accounting machines.

According to a preferred embodiment of the invention, use is made of a different principle, according to which use is preferably made of the impulses supplied by the existing distributor in the accounting machine, such impulses being characteristic of each of the possible values of the decimal figures recorded on the card or in a totalizer. According to this embodiment it is possible to form in the time, the "chain" of values of the figures of a number to be checked, such values being arranged in a definite order and being issued successively by the action of the distributor.

Therefore, it is an object of the present invention to provide calculating arrangements for the symbol of a given number in which use is made of: a distributor issuing the successive decimal values; a balanced counter, that is to say, a counter which adds cyclically in the selected base "$n$," the figures of the number to be controlled for each of the possible decimal values, allocating to them a "weight," which is variable with the rank of the figure in the number; a multiplier which produces the product of each of the said values with the corresponding counted number, retaining from the multiplier a multiple of the said base which is as large as possible; and a recorder of the result cyclically totalizing on the said base supplied by the multiplier.

In the practical embodiments particularly herein described by way of example, the invention has for its first objects:

A device for controlling additions;
A device for controlling subtractions;
A device for controlling multiplications;
A control device capable of carrying out both the control of multiplications and additions. The same control device may also successively carry out successive controls of multiplications in the rhythm at which they are executed by the accounting machine, and to control, once these multiplications are completed, an addition operation of the successive products of the said multiplications. It is obvious that this above list is not exhaustive as soon as the principle and apparatus of the combination of devices forming the last item of said list is understood.

For example, on similar principles, starting from the elements and references supplied by the present description, it is possible for an expert to construct, without special experiments or novel features, a control device for divisions, this operation only being the converse of multiplication, the remainders being treated as explained hereinafter.

The invention also relates to an arrangement for controlling the accuracy of the transcription of figures to record cards or strips for accounting machines or other accounting documents.

As it is a question of machines intended for practical applications such as the calculation of pay sheets or the like, the recorder of the result of an operation according to the invention will also comprise a totalizer portion which only retains the principal portion of the result (in practice, the round number); the remainder, namely the centimes, or part ignored in the payment not showing.

The invention is more particularly applied, in a non-limitative example, to the control of the operation $a \times b = c + d$, where $a$ and $b$ constitute two terms to be multiplied together, $c$ being the principal part of the product and $d$ the remainder.

An object of the invention is constituted by a checking arrangement which controls successively by the check arrangement, by $n1$ and $n2$ a succession of operations of the above type, that is to say $a \times b = c + d$, $a' \times b' = c' + d'$, $a'' \times b'' = c'' + d''$, etc. and which enters the control symbols, on the bases $n1$ and $n2$, of the principal parts in the corresponding cyclic totalizers with a view to controlling the recording of the sum $c + c' + c'' + \ldots$, which is the sum effected by the accounting machine and recorded by it on a suitable document such as a recapitulative card; there is thus obtained a check of the perforation or similar recording on the card.

The invention will be better understood and explained by reference to the accompanying drawings, wherein:

Figure 1 is a block diagram showing the principle of a first checking arrangement for numbers. This first arrangement includes two similar calculating members (C, X, I, S, and C', X', I', S') of bases $n1$ and $n2$, respectively, together with record reading-out means (E) and utilization means (U), which arrangement is adapted to verify the equality between a calculated value of a check symbol of recorded data and a recorded value of same symbol.

Figure 2 is a block diagram of a second checking arrangement for additions and subtractions. This second arrangement is formed of twice two calculating members (C1, X1, I, S1, C1', X1', I', and C2, X2, S2, C2', X2', S2'), reading-out means (E) and utilization means (U), which arrangement is adapted to verify the equality of the resulting calculated value of a check symbol obtained from a number of operands of additions and subtractions and a calculated value of the check symbol of the result of these operations as they have been performed by an accounting machine.

Figure 3 is a block diagram of a third checking arrangement for successive multiplications and recapitulative addition of the results of these operations especially when they have been rounded-off. This third arrangement is formed of the elements of the preceding one, to which are added two supplementary adders (S3 and S3') and connections (indicated by arrows ff') to reintroduce the results given by determined elements (S1 and S1') of two calculating members into other elements (X1 and X1') of the related calculating members. Such an arrangement is adapted to verify the equality of the resulting calculated value of a check symbol obtained from a number of operands of rounded-off multiplications and a calculated value of the check symbol of the addition of the rounded-off results of these operations as they have been performed by an accounting machine.

In the block diagrams of Figures 1, 2 and 3, the elements referenced C, X, S forming a calculating member (eventually in association with complementing means I and I') are respectively: a parallel cyclic adder, a cyclically multiplying unit and a symbol recorder. Dash and dot lines in same figures represent sets of connections between the complementing means and other elements of calculating members and the programming means of accounting machines. I and I' are of use for performing a symbol subtraction, a symbol division or when the utilization means are adapted to effect a verification by the sensing of the return to zero of the related symbol recorders.

Figure 4, consisting of Figures 4a, 4b and 4c, is a schematic diagram illustrating an example of a calculating member (C, X, I, S) on base 7.

The principles and devices of its design will be described hereinafter and it is obvious that, on the same principles and with equivalent devices, further calculating members can be readily designed on different bases. Furthermore, according to the same principles of arrangement, anybody somewhat skilled in the art will have no difficulties to aggregate these different devices according to similar objects of those of the present invention. The present devices are herein described only as to give a practical example.

Figure 1:
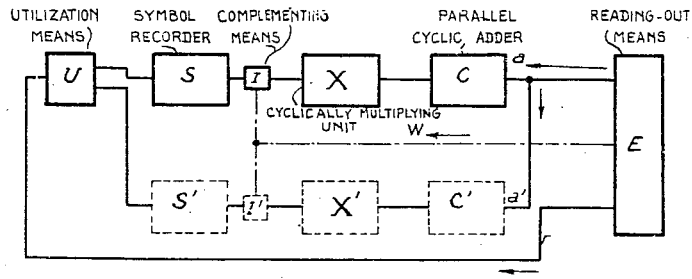

Figure 1 shows, diagrammatically represented in full lines by rectangles, the essential elements of a calculating member of the symbol of a given number enabling this number to be controlled. In this figure, E shows the assembly of the accounting machine, and as already stated, a calculating member comprises a so-called balanced counter or cyclic adder C, a multiplying unit X and a symbol recorder S. In order to explain the purpose and the operation of these elements, it is advisable to take a concrete example.

Let it be supposed that the calculating member functions on the basis of 7—that is to say, the object thereof is to calculate a symbol which is the remainder of the division of the number to be verified by seven—and that the said number to be vertified is 8272843. It is known that:

Table I $10^0 = 1$
$10^1 =$ multiple of $7 + 3$
$10^2 =$ multiple of $7 + 2$
$10^3 =$ multiple of $7 + 6$
$10^4 =$ multiple of $7 + 4$
$10^5 =$ multiple of $7 + 5$
$10^6 =$ multiple of $7 + 1$ (each of the successive remainders 3, 2, etc. determining what is known as number congruences). The symbol then will be formed by the sum of the products:

$$3 \times 1 + 4 \times 3 + 8 \times 2 + 2 \times 6 + 7 \times 4 + 2 \times 5 + 8 \times 1$$

that is to say, the sum of the products of each of the figures of the number by the remainder of the corresponding power of ten as indicated in Table I; which sum is the sum from which is subtracted the greatest possible multiple of 7 which is the selected base.

The present embodiments of the invention having been designed to be used particularly in usual accounting machines, it is to be noted here that, according to one of the more usual record card codes, the index point positions in each column of a card are separated in two groups: the first one consisting in points 9, 8, 7; the second one consisting in points 6, 5, 4, 3, 2, 1, 0, 11; the index position 11 being used only when registering a letter or being representative of a full stop. In the accounting machines adapted to this code the machine-points are fifteen in number for each sensing, calculating or recording cycle of the machine; each of these points succeeding to the others in each of the recurring cycles in the following order: 9, 8, 7, 6, 5, 4, 3, 2, 1, 0, 11, 12, 13, 14, 15.

In order to obtain the remainder of the sum referred hereinabove, of which the sevens have been casted out, use is made of a distributor slightly modified of the accounting machine which issues successively the decimal Figures 9, 8, 7 . . . 1, 0 in the form of impulses emitted at corresponding instants or points (as explained hereinbefore) on separate input lines of the related parallel cyclic adder (or balanced counter), that is to say, there are formed (in the present example):

Table II

At the point 9: 0
At the point 8: 2+1
At the point 7: 4
At the point 6: 0
At the point 5: 0
At the point 4: 3
At the point 3: 1
At the point 2: 5+6 (equivalent to 4 with a base of 7)
At the point 1: 0
At the point 0: 0

The cyclic adder C has for its object to count, in the present example at the point 8, the two columns (of the recording card) of respective weights 2 and 1 and to add them together with these weights; at the point 7 a column of weight 4 etc. The multiplier X effects the multiplications of the value of the point (that is to say, respectively and successively 9, 8, 7, . . . etc.) by the balanced result supplied by C at each point, for example, 8×(2+1), 7×4, but subtracting if possible 7 from the multiplier. In this respect, it is pointless to multiply by 8, because 8=7+1; it will be sufficient to multiply by 1. To multiply by 7 is equivalent to multiplying by 0. To multiply by 9 is equivalent to multiplying by 2. Finally, the recorder S cyclically adds these successive products on the base 7 (deducting a multiple of 7 which is as large as possible).

It is pointed out that, generally speaking, such a calculating member cannot in itself, if its base is any ordinary number avoid certain errors of transcription of any number: if for example, at one point a 1 is recorded instead of an 8, there is obtained the same symbol if the base is 7. Therefore it is of value to use two calculator members, one of which will function for example on base 7 and the other on a different base, for example 3. The second calculating member, forming with the first member and accompanying elements, a checking arrangement, is shown in broken lines. It is operated in parallel through $a'$ by the same data as those entering at $a$ into the first member. The two partial symbols supplied at S and S' may be combined, for example by addition, for forming at U the final symbol which is compared with that which is read at $r$ on the record card. In the event of a difference being found in the comparison, U comprises an utilization member which becomes operative according to the control wanted for each error so detected. In certain cases however it is possible to obtain a checking arrangement, by using solely a part of the means described herein, which arrangement is controlled by a parallel sensing device for registered data (said arrangement being adapted according to an embodiment of the invention and being also applicable to the control of operations) to obtain a check on a single base "$n$"; a single calculating member such as S.X.C. will be then sufficient. This control may be considered as sufficiently effective if $n=11$ or $n=31$, for example.

The block diagram of Figure 1, being a diagram of principle, the connections which are shown therein, in each case as a single full line, are actually multiple connections (with several conductors). The element I allows the entry into S of values complementary to the selected base (or negatively on this base if it is desired); this member may be incorporated in S.

Figure 2:
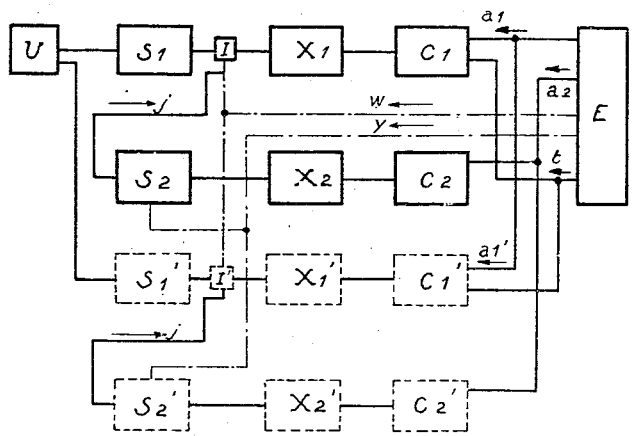

Figure 2 shows a block diagram of a checking arrangement for additions and subtractions constructed with similar elements. In a first cycle of the machine from the point 9 to the point 0, there arrive at $a1$ and $a2$ the two data to be added which each enter into a chain or two chains altogether, to which are allotted respectively the indices 1 and 2. In nearly the same manner as in Figure 1, there are preferably two other similar chains which function on another base and for which the devices $S_1'$, $X_1'$, $C_1'$, $S_2'$, $X_2'$, $C_2'$, similar to $S_1$, $X_1$, $C_1$, $S_2$, $X_2$, $C_2$, have been represented in dotted lines. The output of $S_2$ is returned to $S_1$ at the said point 11 of the same cycle occurring after the point 0 in such manner as to form a calculated symbol value representative to the sum in respect to base "$n1$" (or of the difference, by the action of the member I in the case of subtraction). The value of the symbol representative in respect to same base of the result of said operations, read-out through "$t$," is sent into $S1$ to reset it to zero position when the calculated and read out values of the symbol of the sum are not equal. In the contrary case, an utilization apparatus U is energized under control of any other position of $S1$ according to the utilization wanted.

Figure 3:
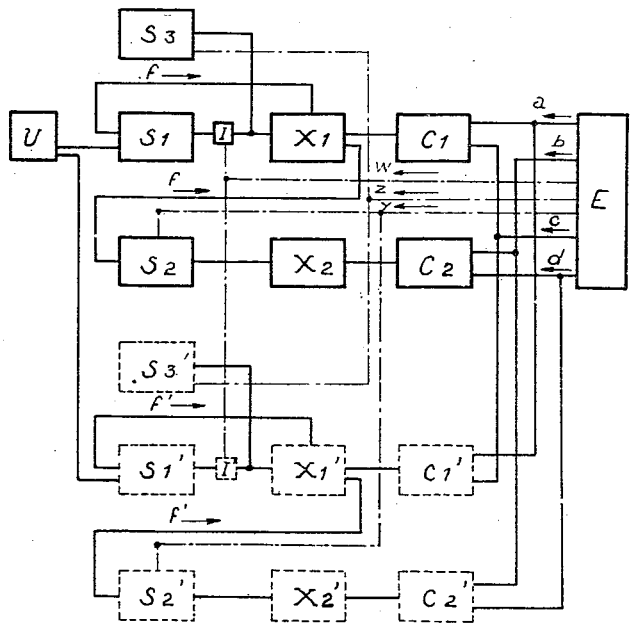

Figure 3 represents a block diagram of an arrangement for checking successive rounded-off multiplications and the final addition of the main parts of the products. As for Figures 1 and 2, it is preferable that each element operating according to base $n1$ (with the exception of E and U), to be duplicated by a similar element operating on another base $n2$. The operations to be checked are $a \times b = c+d$, $a' \times b' = c'+d'$, and $c + c' + \ldots = m$, which is a perforated or registered grand total, the perforation or register storage position being the object of the checking. S3 is a register where the symbols $c$ forming $m$ are cyclically totalized. The operations are as follows:

In a first cycle, from the point 9 to the point 0, the partial symbol of $a$ is formed in S1 and that of $b$ in S2; then, at the point called 11 occurring after the point 0, these values are applied, according to the arrows $f$, to the multiplier X1 which forms their product, the 7's being casted out. This partial symbol product $ab$ changed in sign passes into S1. In a second cycle of the points 9 to 0, the partial symbol of $c$, supplied by the accounting machine passes into S1 through X1 and simultaneously into S3, and at the same time the partial symbol of $d$ passes into S2; then at the point 11, there is obtained in the multiplier the multiplication in partial symbols $d \times 1$, which also sends its result into S1. The aggregate operation carried out in S1 on the partial symbols is:

$$-(a \times b) + c + d = 0$$

If S1 is not brought back to 0, the utilization member U of the disclosed error becomes operative. S3 functions partly as an adding arrangement on the values which are passed to it; such an arrangement is already known per se. At the end of the operations, it can be used to indicate the partial symbol of $m$ to compare it with a recorded one, with or without complementing by I or I'.

Figure 4A:
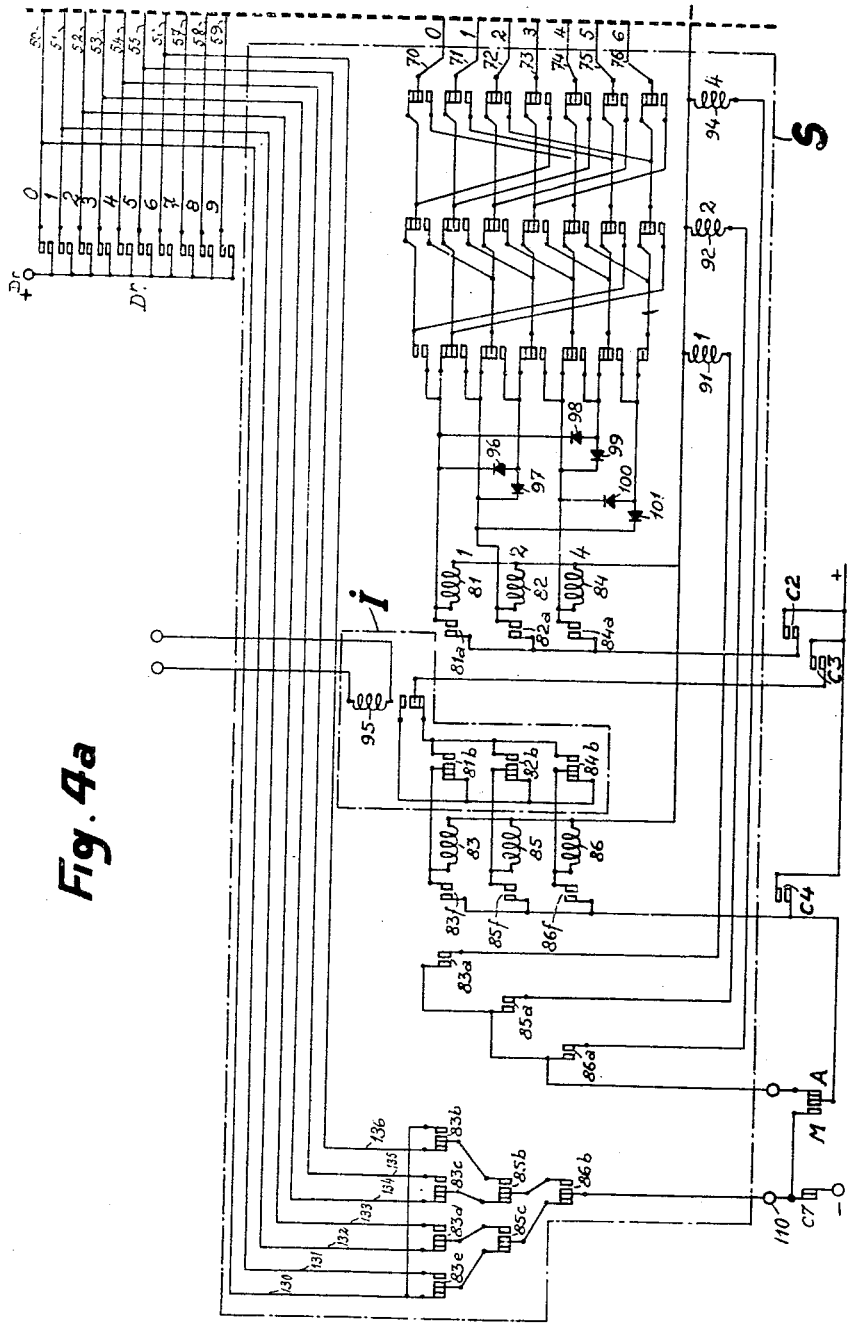
Figure 4:
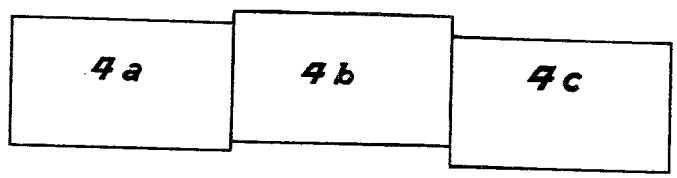
Figure 4B:
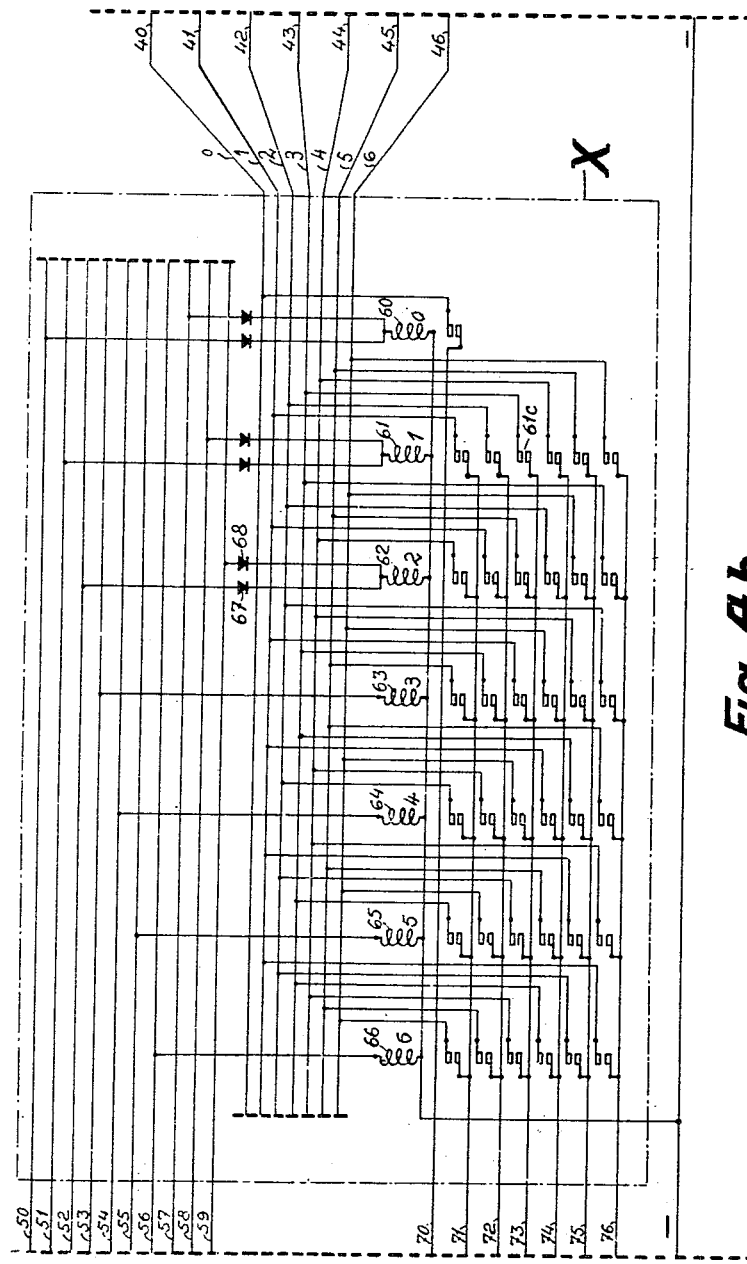
Figure 4C:
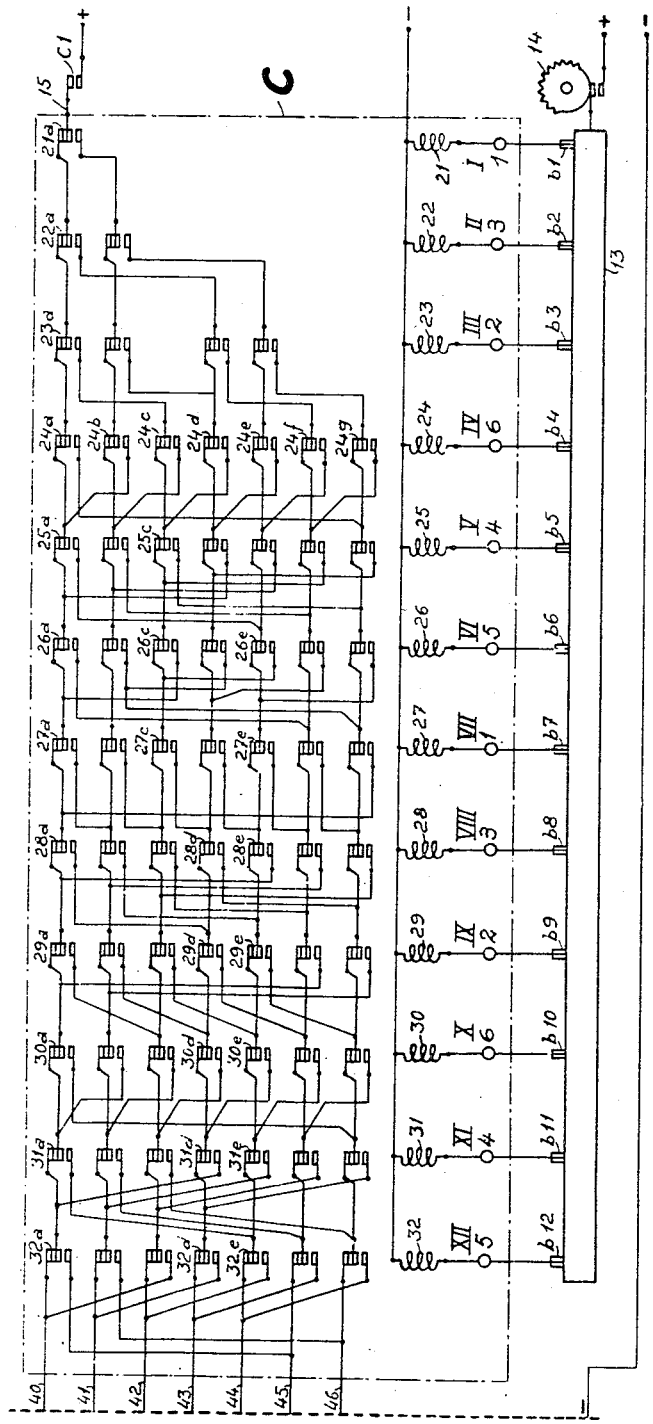

Figures 4a, 4b and 4c, the assembly of which forms Figure 4, show, for example, an embodiment of a preferred mode of arrangement of the different elements C, X, S, I, which are, in these figures, delimited separately by dash and dot lines and are adapted to operate on base 7.

For the following explanation of the operation of the circuits shown in Figures 4a, 4b, and 4c, it is desired to form the symbol of a decimal number having 12 figures, each distinctly represented by a single perforation in a column of a record card, but without thereby having any intent to limit the invention to this example of embodiment.

The card passes between a cylinder 13 (Figure 4c) (fed intermittently with positive voltage by a rotatable circuit breaker 14) and brushes b1 to b12. Each of the columns of record card in which there is a perforation excites at the corresponding "index point" one of the relays 21 to 32 concerned, by which the circuit is closed. These relays close their contacts referenced by the indices "a" to "g" at this moment for part 14 of point-time τ of Figure 5 pending which an index point is sensed. Shown next to the input line of each column I to XII of element C is the characteristic figure value of the congruence as indicated in Table I. A positive voltage arrives, pending the closing time of a position of distributor 14 and as indicated on Figure 5, through a cam contact C1 on terminal 15 at the right-hand end of the schematic circuit diagram and passes into a chain of contacts in a leftward direction. If none of the relays is excited, the voltage passes to 40, the circuit being in a straight line and passing through the contacts with the index "a" (21a—32a). When one of the relays is excited, the voltage will be displaced, as will be appreciated by following the connections, to one of the conductors 40—46, the extent of the displacement being that of the figure value of the congruence corresponding to the line of the excited relay. If two relays are excited simultaneously, the displacements are added cyclically, that is to say, two displacements of 3 give a displacement of 6, and two displacements of 4 give 1, equivalent to 8—7, etc. There is thus obtained the "balanced counting" of the figures recorded according to their size. Thus, to return to the above example, assuming the number recorded on the card to be 000, 008, 272, 843, at the point 9, the voltage appears at 40; at the point 8, the relays 23 and 27 are excited; this causes a displacement of 3 and the voltage appears at 43 passing through 21a, to 23a, 24c to 27c, 28d to 32d; at the point 7, only the relay 25 is excited and the voltage appears at 44, etc.

The principles of design of the reading-out means (E in Figures 1, 2 and 3), as conventionally illustrated in Figure 4c and described hereinbefore, are well known and are, in practice, used in different manners which comprise, for example, mechanical, electrical and optical sensing means; those means being used separately or in aggregation to sense the data or records or registers. The essential facts here are that the record card or strip is sensed in parallel in respect to its columns and that the recorded data are recorded in two (it could be several and in some cases only one) distinct groups of index point positions for each sensed column, each of said distinct groups being allocated to a distinct calculating member according to the connections established between an impulse distributor (Dr in Figure 4c) and an element of said calculating member: the multiplier X (Figure 4b) in the example described.

The principles of design of adder C (as illustrated in Figure 4c as an example of embodiment which is described hereinbefore) allow that the electro-magnetic relays shown in the figure can be replaced by a combination of equivalent means such as electronic bistable triggers and electronic gates, for example; the essential facts here are that, if there is for a machine-point an index mark in a column, the path followed by an impulse entered in adder C (by cam contact C1 in Figure 4c) is displaced from a direct connecting line connected to an output connection (such as 40—46) allocated to a value A to another connecting line connected to an output connection allocated to a value B and that is effected in parallel for each sensed column of the record and cyclically and successively for each index point position containing one or a plurality of recorded marks: the circuit arrangement is in itself a simple problem of connections. In view of the aim of the present invention, for each column containing a mark in a determined index point position, each difference between values A and B is the weight allocated to the column and adder C performs the cyclical addition of all the weights allocated to all columns containing a mark for said index point position.

The sum so obtained is then cyclically multiplied by the value of the index point position by cyclically multiplier X, and so successively for all the index point positions, as it will be explained hereinafter.

The lines 40 to 46 leaving the parallel cyclic adder C feed the cyclically multiplying unit X (Figure 4b). The multiplying unit is fed also by ten lines 50—59 which in turn receive their positive voltage from the distributor Dr of the accounting machine or from any other suitable distributor. At each "point," a different one of these lines is placed under voltage for an instant. The lines 50—56 feed relays 60—66 which are excited in synchronism with the points and in rotation. Lines 57—59 also excite 60—62. In this case, 7 is equivalent to 0; 8=7+1; 9=7+2. The contacts of the relays 60—66 and the corresponding connections to the input lines 40—46 and to the output lines 70—76 make it possible to carry out the multiplication table in the selected base 7, the 7's being casted out, as will be readily understood. Thus, at the point 8, the relay 61 is excited and the voltage which appears as explained in the above example at 43 is transmitted to 73 by 61c. It is to be reminded that this multiplication is effected cyclically and that there is no carry-over; the multiplication is cyclic on the base 7, for example, 3×3 gives 2.

It will be seen on the drawing that the relay 62 is fed at the same time by the lines 52 and 59 through the intermediary of unidirection elements 67 and 68 in order to avoid cross-interferences; it is the same thing for 60 and 61. It is possible to replace these unidirectional elements by intermediate relays or any other known equivalent means without departing from the scope of the invention.

The principles of design of multiplying unit X as it is illustrated on Figure 4b are fairly analogous to those of adder C, and as for this adder can be applied with a diversity of equivalent elements. The essential facts here are that if there is, for a determined point, a voltage on one of the input connections 40—46 coming from adder C, the action of one of relays 60—66, under control of the voltage furnished by distributor Dr, according to the determined point value in time D, displaces or switches the voltage appearing on one of the connections 40—46 allocated to a numeral value F to one of the output connections 70—76 allocated to a numeral value G, which is equal to the figure representative of the unities in the product of D by F; and that this operation is effected in parallel for each column sensed and is successively repeated for all the machine-points 9 to 0. It is again a simple problem of connections to effect thus a series of cyclic multiplications.

The positive voltage applied at terminal 15 (Figure 4c) reappears, after passing through C and X, on one of the conductors 70—76, representing a figure from 0 to 6 for each "point" of the cycle. The symbol recorder S (Figure 4a) selectively receives these voltages on relays 81, 82, and 84 through which the circuit is completed to the negative terminal of the voltage source. It is clear that it would be possible to use any known type of totalizing recorder on base 7 in order to form the symbol without departing from the scope of the invention. However, for the purpose of simplification and in order also to facilitate the arrangement of the algebraic sign inverter I for symbol totalizing of additions and subtractions as it will be described hereinafter, the figures introduced into S are converted into a binary system. To this end, the relay 81 represents the value 1, 82 the value 2, and 84 the value 4. A positive voltage appearing (for example on 75) on one of the conductors 70—76 passes through relay contacts 94, 92, and 91 and actuates those of the relays (here 84 and 81), of which the sum of the corresponding values (here 4+1) is equivalent to the value of the figure which is entered. Unidirectional cells 96 to 101 (here 98 and 99) permit a suitable switching. The contacts of the relays 91, 92, 94 are connected in the form of a displacement or shift table, with respective weights 1, 2, 4 in such manner as to be able to totalize the entered figures in the manner about to be described. Actually, the relays 81, 82, 84 have two series of contacts: firstly, the simple contacts "a" acting as a holding contact which is made and broken by a cam contact C2 according to the timing indicated on Figure 5; secondly, alternative contacts "b" which serve, in the position shown in the drawing, to connect respectively 83, 85 and 86 to the negative terminal of the voltage source through the intermediary of the cam C3; the relay or relays which are excited correspond respectively to 81, 82 or 84. The one (or those) of the relays 83, 85, 86 which is excited is provisionally held by its holding contact $f$ (shown broken) and which is energized by the cam contact C4 and excites, by the corresponding closed contacts 83a, 85a, 86a of the same relays, the relays 91, 92, 94. Thus the result of the excitation of a relay 81, 82, 84 is that a corresponding relay 91, 92, 94 is excited, which causes the desired displacement of the contacts of these relays before the entry of the following result, which is formed in multiplying unit X to be totalized in symbol recorder C. The relays 83, 85, 86 actuate alternative contacts 83b, 83c, 83d, 83e, 85b, 85c and 86b connected, as will be seen on the diagram, to a sensing circuit controlled by distributor Dr corresponding to the figures 0 to 6 so as to obtain at the terminal 110 a voltage whose position in time in the next cycle of the machine depends upon the value of the partial symbol formed by the device as it will be explained hereinafter.

If it is desired to enter the figures with a negative sign, that is to say as a complement to the selected base, viz: 7, it is sufficient to excite the relay 95 which permutes its alternative contacts. It is known that with a number written in the binary system in a base "$n$"$=2k-1$, where $k$ is an integer, it is sufficient to obtain the complement to $n$, to invert the 0's and the 1's, or the excited relays and the unexcited relays in the present case. The algebraic sign inverter member I is thus of very simple construction.

Figure 5:
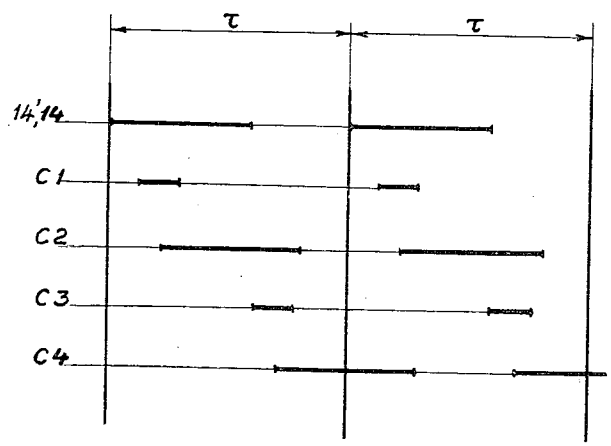
Figure 5 is a graph of the timings for the cam and distributor contacts coming into play, for each machine-point, in Figure 4.

Figure 5 shows graphically the times for closing the cams C1, C2, C3, and C4, and distributors 14 and 14'. The time unit marked $\tau$ corresponds to the length of one "point," which is the time during the major part of which one tooth of 14 bears on its contact and closes it. The closing times of the contacts are regulated in such manner as to permit the successive excitation and the breaking of the relays in their normal sequence. It is obvious that it is possible to employ, instead of cams, combinations of delayed relays, without departing from the scope of the invention.

At the beginning of point 11, there is a representation of the partial symbol stored on contacts 86b, 85c, 85b, 83b to $e$ (Figure 4a). The cam contacts C7 and C4 are closed from the beginning of point 11 to the beginning of point 0 of the next cycle, and cam contacts C1, C2 and C3 are broken for the same time. So the impulses, furnished by distributor Dr pending the points 0–6 of said next cycle through connections 130—136 are selected by the above contacts and only one of these, which impulse represents the partial symbol, appears on terminal 110 for the machine-point having the value of the partial symbol.

It is obvious that, with this arrangement, or any equivalent one, one card is to be fed to the checking device every two cycles. It is not less obvious that any sensing and storing means, suitable to detect if there is a potential on anyone of the connections 130—136, at the beginning of point 11 of a calculating cycle, and to store that information into appropriated contacts or elements which can be sensed by distributor Dr in the same manner as above, allow to feed a card to the checking device one for every cycle.

It will be recalled that the figure obtained on the terminal 110 (Figure 4a) is combined with a similar figure obtained on another base (for example 3) either by addition or by a conventional correspondence table in order to form a letter, for example, for giving the final symbol. There are no difficulties to design a symbol recorder, a multiplying unit and an adder on base 3, or on any other base as well, according to the principles of establishment explained hereinbefore and to the description relative to similar elements of the calculating member on base 7.

Figure 6:
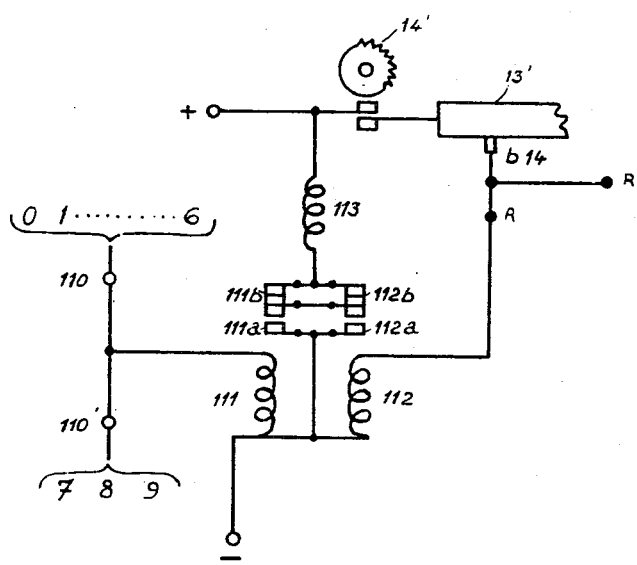
Figure 6 is a schematic diagram showing how the two calculated values forming a symbol originating from one of said arrangements can be used for comparison with the marks of the symbol read on the card or with result symbols calculated by the accounting machine.

In Figure 6 there is shown an example of how the check by 7 and 3 can be carried out for instance for checking the transcription of numerical data accompanied by their checking symbol. It is supposed in this example that a first partial symbol has been calculated on the base 7 and that by using afterwards the impulses delivered by the distributor Dr (Figure 4a) that appear on lines 50—59; a characteristic impulse appearing thus on terminal 110 which is reproduced on Figure 6. Similarly, another symbol impulse is formed in another device constructed exactly along the same lines as the one of Figure 4, excepted that it is much simpler, since its base is 3. To this end, the lines 50—59 of distributor Dr are used again. Thus, owing to the order adapted for the advance of the card under the sensing brushes, in a reading cycle, an impulse first appears on 110' (terminal of this second device) and then a second impulse on 110. These impulses are both successively applied to the coil of relay 111. Another relay 112 is energized by the impulses dead by brush $b14$ across the cams shut by the breaking mechanism 14' and the cylinder 13' from the marks on the record card in the column reserved for the symbol (the symbol being a letter, according to a usual code of record cards, one of the symbol figures is a 7, a 8, or a 9 and the other a figure of a value 0 to 6). Each relay 111, or 112, is provided with alternating contacts which are connected to a locking relay 113.

Supposing for instance that one of the figures of the symbol letter differs from those calculated by the device, for instance, that relay 112 is energized before or after relay 111. Then contact 112b is broken, and 112a closed. Relay 113 is energized and locks the machine, thus giving notice to the operator that the transcription is wrong. On the contrary, when the figures of the calculated symbol fall in register with those of the symbol letter on the card, both relays 111 and 112 are simultaneously energized, both contacts 111a and 112a are simultaneously closed, and current cannot flow through coil 113. In most of the cases, the numerical data are scanned in a first cycle and the symbol letter in another.

The brush $b14$ sensing the symbol marks on the record card delivers the corresponding impulses to the utilization device by connections such as $b14$–R and $b14$–R' (Figure 6), R' being an input terminal of the calculating member on base 3 in the preceding example.

The cam inverters M–A and M–140 are not normally employed in the utilization of the checking arrangement according to Figure 1. It is more particularly provided in the case of Figure 3 and actuated in accordance with the programme of the machine in order to operate the sending back to a multiplier of a figure formed in a recorder as it will be explained hereinafter.

Modifications may be made in the symbol recorders, the adders and the multiplying units without departing from the scope of the invention, as described relatively to the checking arrangement of Figure 1, and supplementary members may be added, for example, for adaptation to a check of arithmetical operations.

As it is well known (see for instance: "Elementary Theory of Numbers" by Uspensky and Heaslett, pages 128–129, published by McGraw-Hill, New York, 1939), the properties of congruences of numbers are such that if there are check symbols, each allocated to each term of an addition, a subtraction or a multiplication, the check symbol of the resulting term of these operations is identical to the result of, respectively, the cyclic addition, the cyclic subtraction of the cyclic multiplication having for operands the respective check symbols of the terms of the above arithmetical operations. By casting out of the dividend the remainder of an effected division, the check of the division of this "corrected" dividend by the divisor can be made by verifying that its check symbol is identical to the result of the cyclic division of the check symbols of the operands. The casting out of the remainder being a subtraction, which can be checked, the results of the division are both checked according to the principles expressed hereinabove.

Each of the partial symbols given by one of the calculating members according to the present invention is suitable for similar checking operations. Further a number of partial symbols can be reduced to a single check symbol by a cyclic addition, a cyclic subtraction or a cyclic multiplication; this single check symbol being also suitable for such a check of operations.

Figures 1, 2 and 3 are block diagrams of arrangements of calculating members together with other devices well known and of common use in automatic accounting machines. These arrangements operate according to the properties of congruences of numbers and according to the main features of the present invention; which features consist in adding simultaneously and cyclically the "weights" of all the record columns in which a digit of a number is recorded for one of the index point positions, multiplying the result of such an addition by the code value of the index point and adding the results of such multiplications which are made for each different index point.

Figure 1 relates to an arrangement comprising two distinct calculating members; its main functions have been described herein before and its elements examined relatively to detail embodiments in the invention. The complementing means, illustrated here as I and I' and which can be included in S (Figure 4a: relay 95, alternative contacts 81b, 82b and 84b), have for object, as said hereinbefore, the computation of the complements to the cyclic base of the partial symbols of a number: they can be controlled by a mark or perforation in a separate column through connections $w$. The result of the sensing of a recorded number are entered into the calculating members by connections $a$ and $a'$ (such as I to XII on Figure 4c) and the result of the sensing of the related recorded check symbol are entered afterwards in the utilization means by connections $r$, in view of comparison with the calculated symbol.

Figure 2 relates to an arrangement for verifying the recorded operands and the recorded results of additions and subtractions. The recorded operands of one of these operations are read out through connections $a1$ (or $a1'$) and $a2$, and they are entered as illustrated in two identical pairs of calculating members, each of the numbers of a pair operating on different bases. As said hereinbefore, the result of one of these members of each pair is added or subtracted (as a complement) to the result of the other by the means of connections $w$ and $j$, $j$ being energized under action of inverter M–A (Figure 4a) which is under control of a mark or perforation read-out through connections $y$. After that, the corresponding partial symbol is read-out towards the second of these members by connections $t$, the connections $w$ being again energized as indicated hereinabove. It results that the result indicated by the symbol recorder must be a zero. That is sensed in each pair by the utilization means which reacts accordingly.

It is to be noted that the same arrangement can also verify the grand total of a number of results recorded in a group of cards, if the symbol is recorded in the last or the recapitulative card of the group.

Figure 3, as described hereinbefore, relates to an arrangement for verifying rounded-off multiplications as well as the grand total of the rounded-off results of these operations. As it has been said hereinbefore the elements utilized in this arrangement are those of the preceding one with the adjunction of two adders of any known type. For each multiplication, the multiplicand is read out by connections $a$, the multiplier by connections $b$, the rounded-off product by connections $c$, and the remainder or rounded-off part of the product by connections $d$. As said hereinbefore, the action of inverters M–A or M–110 returns, according to arrows $f$ and $f'$, the partial symbols, which have been formed in the calculating members allocated to the multiplier, to an input of the multiplying unit of the related calculating members of the multiplicand. This input energizes in time the index point value entry means of said multiplying unit (in a similar and known manner and same means as distributor D$r$ feeds the connections 50—59 in Figures 4a and 4b). Read-out connections $w$ and $y$ have the same action as in the arrangement illustrated in Figure 2. Read-out connections $z$ under control of an appropriated record mark or perforation, determine the read-out of the elements of the partial symbols of a grand total from S3 and S'3, which elements forms said symbols in the related symbol recorders.

With the circuits and elements of Figure 3, anybody somewhat skilled in the art can, with only slight modifications, adapt the device to the check of a number of divisions without remainders or of one division with a remainder.

Other useful modifications are inherent in the embodiments described and it is my intention that the present invention be limited only by the scope of the following claims.

I claim:

1. A device for controlling the transcription of numerical data accompanied by a check figure on records for accounting machines, comprising: data reading out means for sensing successively the digits of such data in a predetermined order of index point values; a cyclic adder having a predetermined number of cyclically recurring representative positions; means for entering into said cyclic adder as many conventional numbers as there are successively such digits for every distinct one of said index point ordered values, every one of these conventional numbers being equal to the characteristic figure of congruence in respect to said predetermined number for the corresponding denominational orders of the related digits in said data; a multiplying unit for multiplying the result delivered by the cyclic adder by a number equal to one of said ordered values, when these values are smaller than said predetermined number, and equal to one of said values less the greatest included multiple of said predetermined number when these values are equal to or greater than said predetermined number; means for entering successively such results and values for all index points into said multiplying units; a cyclic totalizing register having same said number of recurring representative positions for adding together the products delivered by said multiplying unit, said register being provided with means of introduction for such products; means for detecting the final result delivered by said register; reading-out means for sensing the recorded check figure and means for signalling an error in case of a discrepancy between said final result and said sensed check figure.

2. A device for checking arithmetical operations executed and recorded by a record card controlled accounting machine, comprising: data sensing means for sensing successively recorded operands and result of said operation, means for entering successively each operand and result into differently calculating units, every unit calculating the remainders of the division of the corresponding operand or result by one of predetermined different integers; means for detecting and registering the remainders calculated by every one of said calculating units; means for resetting to zero said calculating units; connecting means between the calculating units corresponding to every one of said integers whereby an arithmetical operation similar to the operation to be checked is carried out on the remainders relating to the corresponding operands; means for comparing the results of said operation carried out on the remainders relating to said operands with said calculated remainders of the result of the operation to be checked; and means for signalling an error in case of a discrepancy between the two groups of results thus compared.

3. A device for checking arithmetical operation executed and recorded by a record controlled accounting machine, comprising: data sensing means for sensing recorded operands and result of said operation; differently calculating units associated in groups, each group being fed successively by all said operands and by said result, each group calculating the remainders of the division of all the introduced numbers by a determined integer; means for entering each operand and the result into the related groups of the calculating unit; means for detecting and registering the remainders calculated by each group connecting means between the calculating units corresponding to every one of said groups whereby an arithmetical operation similar to the operation to be checked is carried out on the corresponding remainders relating to the operands; means for comparing the results of said operation carried out on the remainders relating to said operands with said calculated remainders of the result of the operation to be checked; means for signalling an error in case of a discrepancy between the two groups of results thus compared.

4. A device for checking arithmetic operation executed and recorded by a record controlled accounting machine, comprising: data sensing means for sensing the digits of operands and result of said operations in a pre-determined order of index point values; cyclic adders having each a different predetermined number of cyclically recurring representative positions, these cyclic adders being associated in groups working in parallel, each group being fed by all said operands and hereafter by said result; means for entering respectively into each cyclic adder as many conventional numbers as there are digits for any successively sensed index point value in the operands and result, every one of these conventional numbers being respectively equal to the characteristic figure of congruence in respect to said predetermined numbers for the corresponding denominational order of any sensed digit in any one operand and result; a set of cyclic multiplying units connected to each cyclic adders for cyclically multiplying the result delivered by the corresponding cyclic adders by numbers equal to said index point ordered values when these values are smaller than the related predetermined number, and to said values less the greatest included multiple of the related predetermined number when these values are equal to or greater than the related predetermined number; means for entering successively into the multiplying units such results and values for all index points; a set of cyclically totalizing symbol registers, each one corresponding to a cyclic adder for cyclically adding together the products delivered by the related multiplying unit; whereby a symbol is obtained means for introducing such symbols in the related symbol registers; means for detecting and registering the results delivered by each symbol register; means for resetting to zero said cyclic adders, said multiplying units and said symbol registers; connecting means between the cyclically totalizing symbol registers of each group whereby an arithmetical operation similar to the operation to be checked is carried out on the corresponding symbols; means for comparing the results of said operations carried out on the remainders relating to said operands with the registered results related to the arithmetic result of the operation to be checked; and means for signalling an error in case of a discrepancy between the two groups of results thus compared.

5. A device for checking a decimal arithmetical operation executed and recorded by a record controlled accounting machine, comprising: data sensing means for sensing successively the digits of operands and result of said operation in a predetermined order of index point values; a plurality of cyclic adders set up in two groups having respectively seven and three cyclically recurring representative positions, each group having two equivalent sections working in parallel, each section being fed successively by one of the operands and result; means for entering respectively into the corresponding sections of each group, as many conventional numbers as there are digits of any successively sensed index point value for the operands and the result, every one of these conventional numbers being respectively equal to the characteristic figures of congruence on bases 7 and 3 of the value of decimal denominational order of any sensed digit in any one operand and result; a plurality of cyclic multiplying units connected to each cyclic adder for cyclically multiplying the results delivered by the corresponding cyclic adder by numbers equal to said index point ordered values when they are respectively smaller than 7 and 3, and to said values less the greatest included multiple of 7 or 3 when these values are respectively greater than 7 and 3; means for entering successively into the multiplying units such results and values for all index points; a plurality of cyclically totalizing symbol registers connected to each cyclic multiplying units for cyclically adding together the products delivered by the related multiplying unit whereby a symbol is obtained; means for introduction of such symbols in the related symbol registers; means for detecting and registering the results delivered by each symbol register; means for resetting to zero said cyclic adders, said multiplying units and said symbol registers; connecting means between the cyclically totalizing symbol registers of a group whereby an arithmetical operation similar to the operation to be checked is carried out on the symbols corresponding to moduli 7 and 3, means for comparing the results of said operations carried out on the remainders relating to said operands respectively with the two registered results related to the result of the multiplication to be checked; and means for signalling an error in case of discrepancy between the two groups of results thus compared.

6. A device for checking a rounded-off multiplication executed and recorded by an accounting machine, operands and two results (multiplicand, multiplier, rounded-off product and remainder of the product) being registered on a record for such a machine, such device comprising: data sensing means for sensing successively the digits of said operands and said results in a predetermined order of index point values; a plurality of cyclic adders set up in groups having each a different predetermined number of cyclically recurring representative positions, each group having two equivalent sections working in parallel, one section being fed successively by the multiplier and the first result and the other by the multiplicand and the second result; means for entering respectively into each cyclic adder as many conventional numbers as there are digits of any successively sensed index point value in said operands, every one of these conventional numbers being respectively equal to the characteristic figure of congruence in respect to said predetermined numbers for the corresponding denominational order of any sensed digit in said operands; a plurality of cyclic multiplying units connected to each cyclic adders for cyclically multiplying the result delivered by the corresponding section of a cyclic adder by numbers equal to said index point ordered values when these values are smaller than the related predetermined number, and to said values less the greatest included multiple of the related predetermined number when these values are greater than or equal to the related predetermined number; means for entering into the corresponding multiplying units such results and values; a plurality of cyclically totalizing symbol registers connected to each said multiplying units adder for cyclically adding together the products delivered by the related section of the multiplying unit; means for introduction of such products in the corresponding sections of the symbol registers; whereby a symbol is obtained means for detecting and registering the check symbols finally stored in each of the symbol registers; connecting means between cyclically totalizing symbol registers and multiplying units of each group whereby a multiplication of the corresponding symbols of the operands and further a sum of the symbols of said first and second result are carried out, the symbol of the second result being multiplied by 1; means for changing the sign of the product of said symbols; means for introducing separately, into a determined totalizing symbol registers, the product of said symbols with its sign changed; and means for signalling an error of the multiplication executed and recorded by the machine when the symbol register which has registered the product, with change of sign, of the symbols of the operands and further the sum of the symbols of the results fail to reset to zero.

7. In a record controlled accounting machine fitted with a checking device as claimed in claim 6, further features for checking a final addition of all the rounded-off products of a series of rounded-off multiplications, operands and results of said multiplications being registered on record cards and the result of said final addition being recorded on a grand total record card together with grand total check symbols, said features comprising: means to operate successively said checking device for every multiplication of said series of multiplications; means to add respectively and cyclically, according to their respective congruences to said predetermined numbers, the check symbols of all the remainders of the rounded-off products of said series of multiplications; means for sensing the results of such additions; means for sensing the index point values of the recorded check symbols of said grand total; means for comparing simultaneously and separately according to said predetermined numbers, said results of such additions with the respectively related sensed index point values of said recorded check symbols; and means for sensing the separate results of such comparisons and for signalling any error for anyone of said separate results differing from zero.

References Cited in the file of this patent

UNITED STATES PATENTS

| | | |
|---|---|---|
| 1,528,567 | Poole | Mar. 3, 1925 |
| 1,770,089 | Simones | July 8, 1930 |